United States Patent Office 3,526,272
Patented Sept. 1, 1970

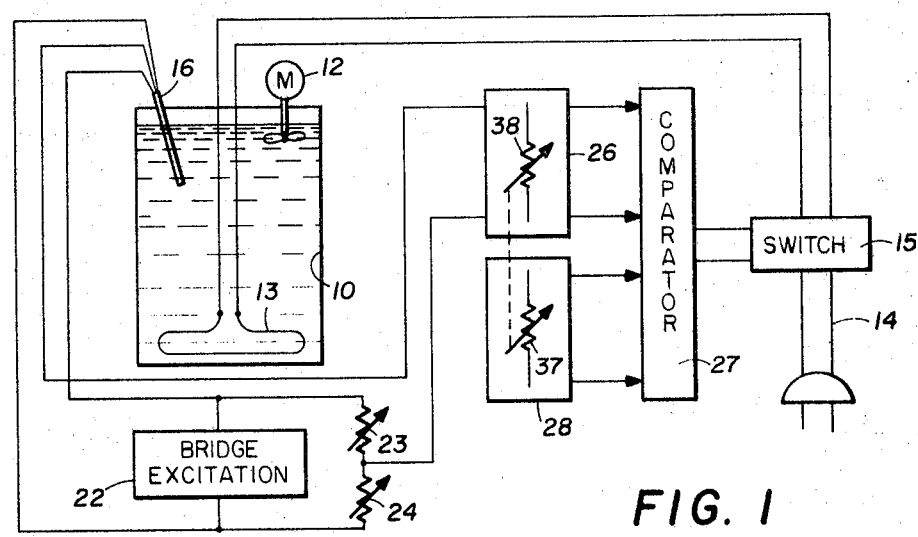
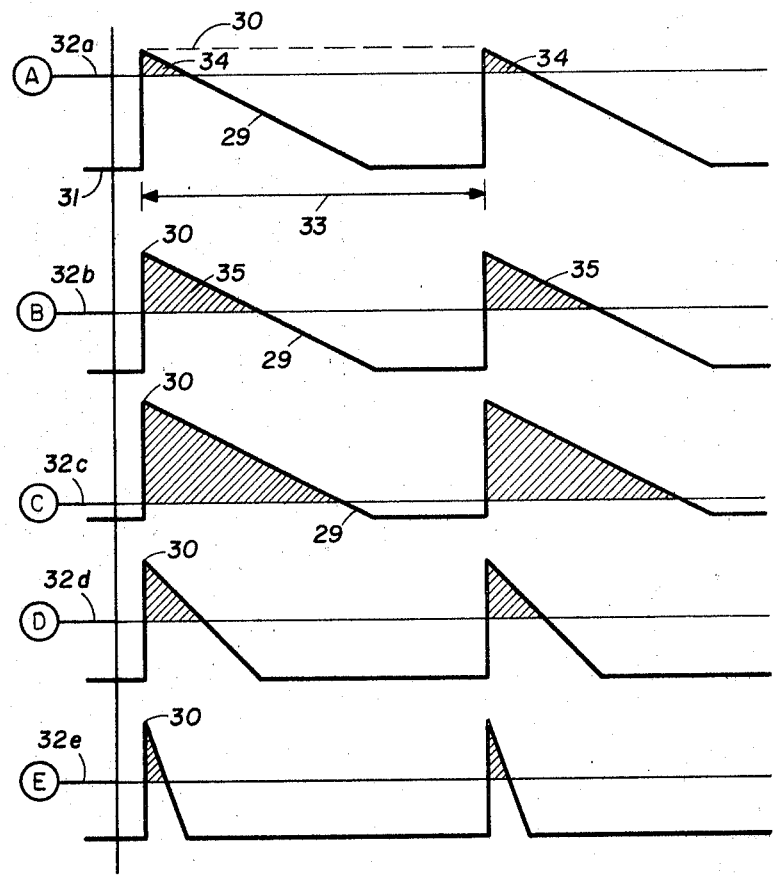
FIG. 1
FIG. 2
INVENTORS:
PAUL J. WATTS
MALCOLM D. CRAWFORD

3,526,272
SERVO TEMPERATURE CONTROL
Paul J. Watts and Malcolm D. Crawford, Orem, Utah, assignors to Tronac, Inc., Orem, Utah, a corporation of Utah
Filed July 29, 1968, Ser. No. 748,342
Int. Cl. B60h 1/00
U.S. Cl. 165—39                                   7 Claims

ABSTRACT OF THE DISCLOSURE

The temperature of a body is maintained other than at ambient by generating an error signal proportional to deviation of the temperature of the body from a reference temperature. This proportional error signal is then amplified and integrated with respect to time, giving an integrated error signal. A reference signal cyclically varies from a level below to a level above the range of the integrated error signal at cycle intervals which are small compared with the time response characteristics of the body. The heat in the body is then changed in a sense in order to reduce the error signal only during that portion of each cycle of the reference signal when the reference signal is greater than the error signal. A type 1 servo is employed in the control loop.

BACKGROUND OF THE INVENTION

Field of the invention

The invention relates to a servo control of the temperature of a body and more particularly to the use of a type 1 servo in a control loop which includes a liquid bath. In a further aspect, the invention relates to the comparison of an integrated error signal with a reference signal of unique character for controlling the application and removal of power from a heating or cooling element in the liquid bath at intervals which are short compared with the time response characteristic of the servo loop.

The prior art

The control of the temperature of a liquid bath has been found to be necessary in connection with many operations. It is particularly important to accurately control the temperature of a liquid bath in which instruments are placed for titration operations of the character described by Christiansen and Izatt in their paper entitled "New Precision Thermometric Titration," Scientific Instruments, vol. 36, 1965—p. 779.

Temperature control of bodies has often been carried out by employing a type zero servo system. It has been found that in such a system the control of the bath has not been sufficiently fine as to accommodate titration measurements of the type above noted.

SUMMARY OF THE INVENTION

Problems encountered in prior art temperature control operations have been overcome by the present invention with the utilization of two distinct system aspects. The first aspect involves the use of a servo loop including a liquid bath wherein a type 1 servo is employed. Heretofore the control of temperature of a liquid bath has not been undertaken with a type 1 servo in the manner of the invention.

The second aspect involves the use of a unique control for a heater in the liquid bath wherein power is applied to and removed from a heat exchange element in respond to the comparison between an integrated error signal and a reference signal. The reference signal cyclically varies over a range which includes the range of error signals, with the power being applied to the heat exchange element only during a selected portion of each cycle of the reference signal. The reference signal preferably varies in a way that will cause a linear relationship between the integrated temperature error signal and the average power into the liquid bath. The period of the reference signal is small compared to the period of the servo loop including the liquid bath. In a further aspect, the servo system is made adaptable to liquid baths of widely different heat transfer characteristics by selective adjustability of the slope of the reference signal, with means being provided for a concomitant adjustment of the signal amplification in order to maintain the AC gain in the servo loop relatively constant.

A phase lead network is employed to prevent overshooting of the reference temperature by reducing the amplified error signal at a rate greater than the rate at which the bath temperature approaches the reference temperature. The integrator which operates on the error signal is biased so that a continuous, steady state signal is generated to activate the heat exchange element for at least a portion of the cycle at all times to prevent "droop" from being caused by steady state heat losses or gains from the environment.

BRIEF DESCRIPTION OF THE DRAWINGS

For a more complete understanding of the present invention and for further objects and advantages thereof, reference may now be had to the following description taken in conjunction with the accompanying drawings, in which:

FIG. 1 is a block diagram of a system embodying the present invention;

FIG. 2 comprises five representative graphs of voltage versus time for the error and reference signals generated in the system of FIG. 1;

THE PREFERRED EMBODIMENTS

Figures 3, 5:
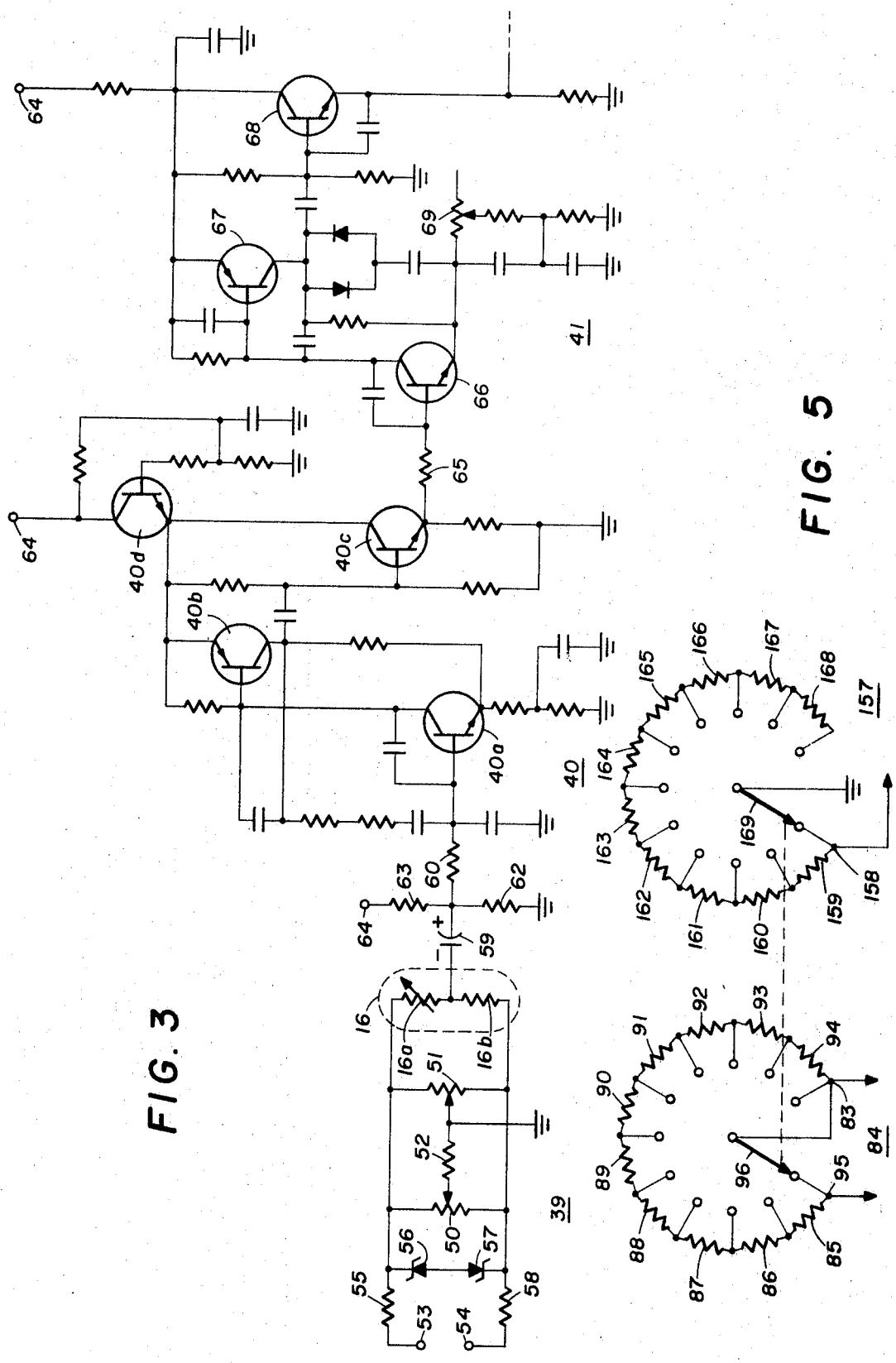
FIG. 3 is a detailed schematic diagram of a portion of one particular system of the type shown in FIG. 1.
FIG. 5 is a more detailed schematic diagram of portions of FIGS. 3 and 4.
Figure 4:
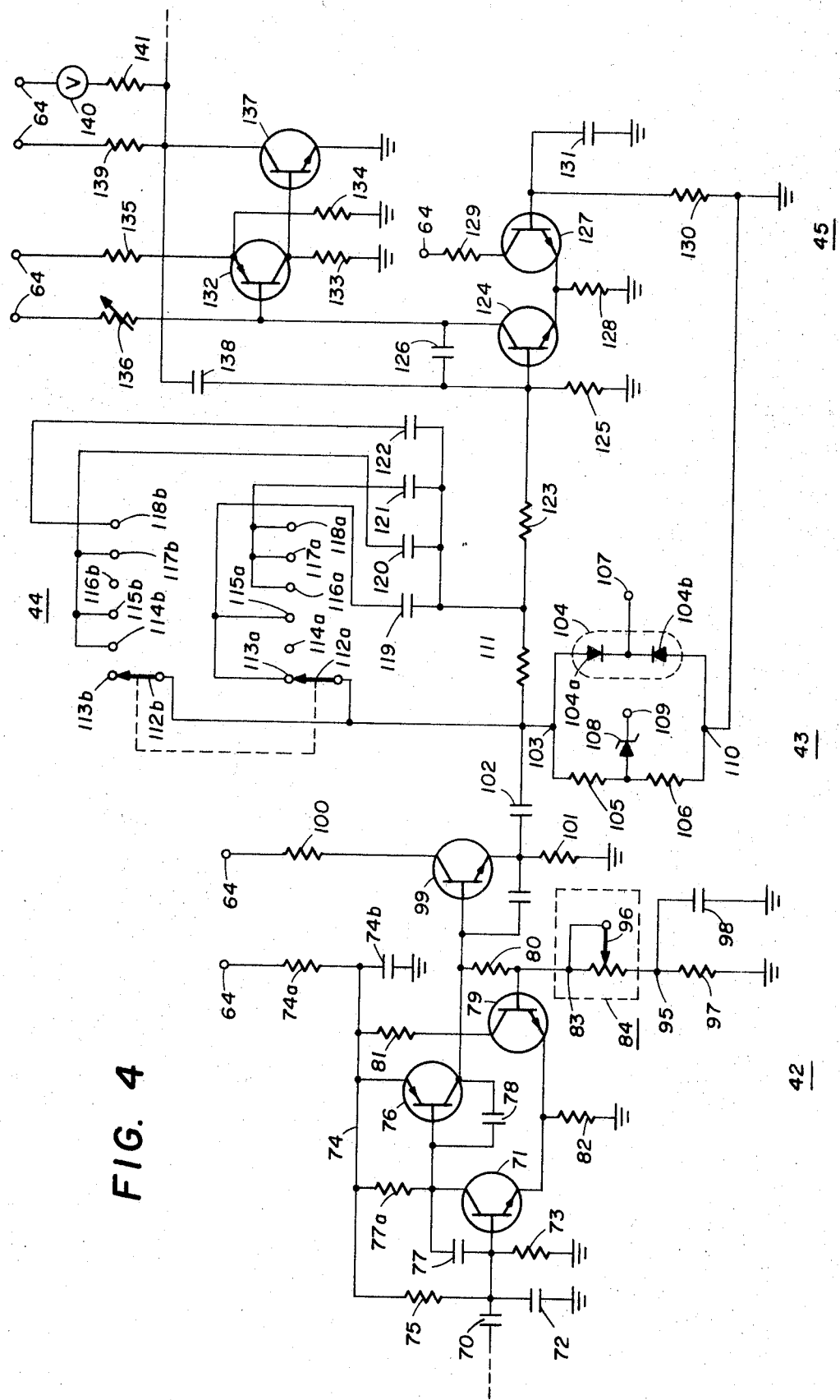
FIG. 4 is a detailed schematic diagram of a further portion of the system partially depicted in FIG. 3.
Figure 6:
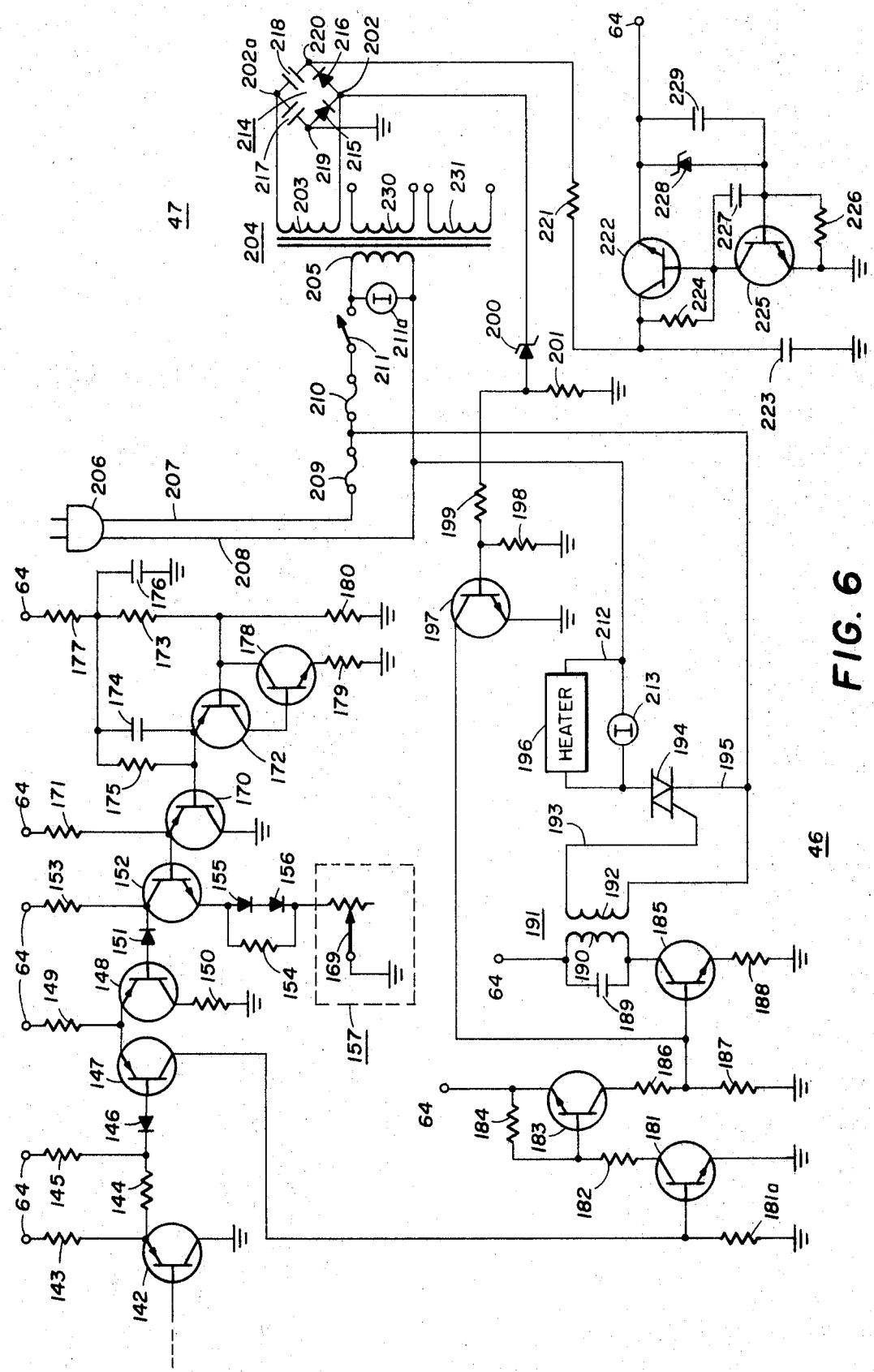
FIG. 6 is a detailed schematic diagram of the remainder of the system shown in FIGS. 3 and 4.

Referring now to FIG. 1, a tank 10 contains a quantity of liquid therein with the level being maintained near the top of the tank. A stirring unit 12 serves to maintain circulation of liquid in the tank and to establish a flow of liquid in the tank past a heater element 13. The heater element 13 is supplied with power from a supply line 14 by way of a switch unit 15. A temperature responsive probe 16 is immersed in the liquid in tank 10. The temperature responsive resistance in probe 16 is incorporated in a bridge network having variable resistive arms 23 and 24. The bridge unbalance signal is taken between the junction of arms 23 and 24 and a corresponding point in the probe, and is applied to an amplifier-detector unit 26. A bridge excitation voltage is supplied from the source 22. The error signal is integrated with respect to time in unit 26. The voltage from source 22 is also supplied to a phase detector section of unit 26.

The output signal from unit 26 is applied to a comparator 27. The output signal is a DC signal proportional to the integral with respect to time of the deviation of the temperature of the water in tank 10 from a predetermined reference temperature, and having a sign dependent on the direction of the temperature deviation. This error signal is compared in unit 27 with a reference voltage from a generator 28. The reference voltage 29 is a voltage of the character shown in FIG. 2. The voltage varies repeatedly and preferably linearly from a level 30, FIG. 2, to a level 31. The fixed period 33 of the reference voltage is very short compared to the time response of the servo loop in which liquid bath 10 is connected. Levels 30 and 31 encompass the range of possible integrated error signals 32, as indicated by the varying levels of error signal 32 in the graphs A–C of FIG. 2. If the integrated error signal 32 is at a level 32a, as in graph A of FIG. 2, the comparator serves to actuate switch 15, FIG. 1, during that portion of the reference voltage cycle above level 32a, as represented by the crosshatched portions 34. Power is applied to the heater 13 during this portion of the reference voltage cycle. During that portion below signal 32 the switch 15 is open, disconnecting the power line 14 from the heater 13.

Graph B of FIG. 2 illustrates the condition wherein a greater heat loss is experienced and therefore power must be applied to the heater for a greater proportion of the heat cycle, the portions 35 representing the portion of each cycle during which the reference signal 29 exceeds the integrated error signal 32. Similarly, the portion of the cycle during which power is applied to the heater is even further increased in graph C of FIG. 2.

In graph D, it will be noted that the reference signal 29 has a much higher slope and consequently a much longer base 31 than in graphs A–C. This condition is even further accented in graph E, where only a small portion of each cycle could possibly cause the power-on condition because the reference signal 29 is at the base level 31 for a substantial part of the cycle.

As will hereinafter be explained, provision is made for readily adapting the servo control to any liquid bath by adjusting the slope of the reference signal from a relatively low slope wherein the signal is changing over substantially the whole cycle to the steep line slope in graph E. This has been indicated by the variable resistance 37 in reference signal generator 28 of FIG. 1. Such an adjustment, however, has the effect of changing the AC gain of the system so that it is necessary to compensate for such change by adjustment of the gain of the amplifier in unit 26 which amplifies the error signal. Such adjustment has been indicated by the variable resistance 38 in unit 26.

For any given slope of the reference voltage the power is repeatedly applied to and removed from the heater 13 in dependence upon the relation between the reference voltage and the integrated error signal. As a result, heat is applied to the liquid bath in a sense to reduce the error. Where the liquid bath is to be maintained at a temperature above ambient, the heater 13 adds heat to the bath. It will be appreciated that it may be desired to maintain the liquid bath below ambient, in which case power would be applied to a refrigeration or heat extraction element to lower the temperature of the bath.

In accordance with this invention, the control exercised over the character of the error signal is such as to make certain that at all times there will be effectively a signal which is responsive to or produced from the error signal such that there will always be some portion of the cycle when power is applied to the heat exchange element. This steady state signal, produced even when there is no bridge imbalance signal, is necessary to avoid "droop" caused by steady state environmental heat losses or gains.

Reference should now be made to FIGS. 3–6, in which a device constructed in accordance with the present invention has been shown in detail. The system has a bridge network 39, the output of which is coupled to a first tuned amplifier 40, a second amplifier 41 and a high gain amplifier 42, in succession. The output of high gain amplifier 42 is connected through phase sensitive detector 43, phase lead network 44 and signal integrator 45 to the heater control section 46. A power supply 47 is provided with connections to the bridge circuit 39, the phase sensitive detector 43 and the heater control section 46.

The bridge circuit 39 contains a bath temperature sensitive probe 16 indicated by dotted outline in which there are shown two resistors, a thermistor 16a and a fixed resistor 16b. The bridge is completed by a fine adjustment potentiometer 50 and a coarse adjustment potentiometer 51 connected in parallel. The center tap of potentiometer 51 is grounded, and interconnected with the tap of potentiometer 50 by resistor 52. The bridge excitation voltage ts derived from the power supply 47 as will hereinafter be described, the excitation voltage being applied to terminals 53 and 54. Terminal 53 is connected by way of resistor 55 to the upper terminals of thermistor 16a, potentiometers 50 and 51 and to one extremity of a pair of back-to-back Zener diodes 56 and 57. Terminal 54 is connected by way of resistor 58 to the lower terminals of Zener diode 57, resistor 16b and potentiometers 50 and 51.

The junction between thermistor 16a and resistor 16b is connected by way of capacitor 59 and resistor 60, in series, to the base of a transistor 40a. The junction of capacitor 59 and resistor 60 is linked to ground through resistor 62, and is connected by way of a resistor 63 to a terminal 64. The terminal 64 is maintained at a fixed voltage above ground by the power supply 47, as will hereinafter be described.

The base of transistor 40a is the input stage of the first tuned amplifier 40, which is an amplifier comprised of four transistors 40a–40d. The amplifier 40 is tuned to the frequency of the voltage applied to terminals 53 and 54, and is so constructed as is well known to those skilled in the art to provide a gain of about 3.2. The output of amplifier 40 is coupled by way of resistor 65 to the second amplifier 41 which includes transistors 66–68. Amplifier 41 is well known in construction as in the art to have a variable gain range of about 2 to 50, the gain being variable by adjustment of potentiometer 69.

The output of amplifier 41 is coupled by way of condenser 70 to the input stage of high gain amplifier 42, which is the base of a transistor 71. The base of transistor 71 is connected to ground through capacitor 72 and resistor 73 in parallel, and to upper node 74 by way of resistor 75. Node 74 is linked to fixed voltage terminal 64 through resistance 74a, and to ground through condenser 74b. A capacitor 77 is connected across the base and collector of transistor 71.

The transistor 71 is directly coupled through its collector to the base of a transistor 76. The collector of transistor 71 and base of transistor 76 are connected to node 74 through resistor 77a. The emitter of transistor 76 is directly linked to node 74, and a condenser 78 links the base and collector of transistor 76. The collector of transistor 76 is coupled to the base of a transistor 79 through resistor 80. The collector of transistor 79 is connected to node 74 through resistance 81. The emitters of transistors 71 and 79 are tied together, and their junction is connected to ground through resistor 82. The base of transistor 79 is connected to one terminal 83 of a gain adjustment rheostat 84. Rheostat 84, shown in detail in FIG. 5, is composed of resistors 85–94 in series between terminal 95 and terminal 83, there being provided taps at each of the terminals of resistors 85–94, and a movable contact 96 for selective positioning on any of such taps. The first terminal 83 is tied directly to contact 96. End terminal 95 of rheostat 84 is connected to ground through resistor 97 and capacitor 98 in parallel. The adjustment of contact 96 is linked to the adjustment of a second rheostat, as will be explained below.

The collector of transistor 76 is connected to the base of a transistor 99. A condenser 99a links the base and emitter of transistor 99, and the collector of transistor 99 is connected to the fixed voltage point 64 through resistor 100. The output of amplifier 42 from the transistor 99 emitter is connected through resistor 101 to ground, and through capacitor 102 to the terminal 103 of phase sensitive detector 43.

The phase sensitive detector 43 is a keyed clamp, having a dual diode 104 connected to terminal 103 in parallel with two series resistors 105 and 106. The facing diodes 104a and 104b of dual diode 104 have their junction connected to terminal 107, and the junction of resistors 105 and 106 is connected through Zener diode 108 to terminal 109. Terminals 107 and 109 receive an excitation voltage from the power supply 97 as will be described hereafter.

The terminal 103 of phase sensitive detector 43 is connected to phase lead network 44, which is adapted to pass the error signal through resistor 111 in parallel with a capacitance of adjustable magnitude. This is accomplished by connecting linked movable contacts 112a and 112b to the input of resistor 111, which contacts may be placed across any pair of terminals 113a–118a and 113b–118b, respectively. A bank of capacitors 119–122 is provided with a common terminal connected to the forward end of resistor 111. The capacitors 119–122 are provided with connections to terminals 113a–118a and 113b–118b so that, by linked movement of contacts 112a and 112b over pairs of said terminals, capacitance of varying magnitude may be placed across resistor 111. The upper end of capacitor 119 is connected to terminals 113a and 115a. The upper terminal of capacitor 120 is connected to terminals 114b–118b. The upper end of capacitor 121 is connected to terminals 116a–118a, and the upper terminal of capacitor 122 is connected to terminal 118b. As the contacts 112a and 112b are moved from 113a and 113b to 118a and 118b, increasing amounts of capacitance are placed in parallel with resistor 111.

The junction of capacitors 112 and 122 and resistor 111 are connected through resistor 123 to the input of signal integrator 45, which is the base of a transistor 124. The base of transistor 124 is connected to ground through resistance 125, and the base and collector of transistor 124 are linked by condenser 126. The emitter of transistor 124 is tied to the emitter of a transistor 127, and their junction is connected to ground through resistor 128. The collector of transistor 127 is connected through resistor 129 to the constant voltage terminal 164. The base of transistor 127 is connected to ground through resistor 130 and condenser 131 connected in parallel. The collector of transistor 124 is coupled to the base of a transistor 132, the collector of which is connected to ground through resistor 133. The emitter of transistor 132 is connected to ground through resistor 134, and to terminal 64 through resistor 135. The junction of the base of transistor 132 and the collector of transistor 124 is connected to the fixed voltage terminal 164 through a variable resistor 136. The collector of transistor 132 is coupled to the base of grounded emitter transistor 137. The collector of transistor 137 is connected back to the base of transistor 124 through integrating capacitor 138. The collector of transistor 137 is connected to terminal 64 through resistance 139, in parallel with a voltage meter 140 coupled with suitable resistance 141 for displaying the output of signal integrator 45.

The output of the integrator 45 is connected to the base of a transistor 142, which forms the input to heater control 46. The collector of transistor 142 is grounded, and its emitter is connected to terminal 64 through resistor 143 in parallel with series resistors 144 and 145. The junction of resistors 144 and 145 is connected to the forward terminal of a diode 146. The reverse end of diode 146 is tied to the base of transistor 147, which forms one part of a comparator for comparing the output of the integrator 45 with a reference signal hereinafter described. The emitter of transistor 147 is tied to the emitter of a second comparator transistor 148 and their junction is connected to fixed terminal 64 through resistance 149. The collector of transistor 148 is connected through resistance 150 to ground. The base of transistor 148, which receives the reference signal, is connected to the reverse terminal of diode 151. The forward terminal of diode 151 is tied to the collector of a transistor 152, which is connected to terminal 64 through resistor 153. The emitter of transistor 152 is connected to resistance 154 in parallel with aligned diodes 155 and 156. The terminal of resistor 153 and diode 156 opposite the emitter of transistor 152 is connected to tapped rheostat 157 at a terminal 158. Rheostat 157, shown in detail in FIG. 5, is comprised of resistors 159–168 connected in series and provided with taps at the terminal of each resistor 159–168. A grounded movable contact 169 is provided for engagement with any selected one of the taps. Contact 169 of rheostat 157 is provided with a linkage 157a to movable contact 96 of rheostat 84 in the high gain amplifier 42, such that movement of contact 169 also causes a change in the position of contact 96. Specifically, the linkage of contacts 88 and 153 provides maintenance of a relatively constant AC gain in the entire loop.

The base of transistor 152 is tied directly to the emitter of transistor 170, which is connected through resistor 171 to terminal 64. The collector of transistor 170 is grounded, and the base thereof is tied to the emitter of transistor 172. The base and emitter of transistor 172 are connected by way of resistor 173 in series with the parallel arrangement of capacitor 174 and resistor 175. The junction of capacitor 174 and resistors 173 and 175 is connected to ground through capacitor 176, and to terminal 64 through resistor 177. Transistor 172 is coupled to a transistor 178 so as to form a relaxation oscillator, the base of each being tied to the collector of the other. The emitter of transistor 178 is connected through resistor resistor 179 to ground. The junction of the base of transistor 172 and collector of transistor 178 are connected through resistor 180 to ground, and through resistors 173 and 177 in series to terminal 64.

The collector of transistor 147 is tied to the base of transistor 181, and through resistor 181a to ground. The emitter of transistor 181 is grounded, and the collector of transistor 181 is connected by way of resistor 182 to the base of transistor 183. Resistor 184 is connected across the base of emitter of transistor 183. The emitter of transistor 183 is tied to terminal 64, and the collector thereof is connected to the base of transistor 185 through resistance 186. The base of transistor 185 is connected to ground through resistor 187, and the emitter of transistor 185 is grounded through resistor 188. The collector of transistor 185 is connected to a capacitor 189 in parallel with the primary coil 190 of a transformer 191. The junction of capacitor 189 and coil 190 opposite transistor 185 is tied to terminal 64. One terminal of the secondary coil 192 of transformer 191 is connected by line 193 to the excitation terminal of a switching device 194, which gates one lead 195 to the resistance heater 196 for the liquid bath. The switching device 194 may be a Triac, RCA type 40430. The heater size is dependent upon the size and configuration of the bath with which the system is used.

The base of transistor 185 is connected around transformer 191 to the collector of a transistor 197 which has a grounded emitter. The base of transistor 197, connected to ground through resistor 198, is connected through resistance 199 to the reverse terminal of a Zener diode 200, which is connected to ground through resistor 201. The forward terminal of diode 200 is connected to power supply 47, specifically to one terminal 202 of a secondary winding 203 of transformer 204. The primary coil 205 of transformer 204 is connected to a conventional power source 206 by way of lines 207 and 208. Line 207 has fuses 209 and 210, and a switch 211. An ammeter 211a is connected across primary coil 205 to indicate the switched-on condition of power supply 206. The junction of fuses 209 and 210 is connected to heater line 195, and the power line 208 is connected directly to the heater 196 by way of the opposite heater lead 212. An ammeter 213 is connected across heater 196 to indicate the closed condition of switch 194.

Secondary coil 203 of transformer 204 has terminals 202 and 202a connected across a voltage doubler 214.

Terminal 202 is connected to the forward end of diode 215, and to the reverse terminal of a diode 216. Terminal 214 is connected to the positive side of a condenser 217, and to the negative plate of a condenser 218. The negative side of condenser 217 and the reverse terminal of diode 215 have a grounded junction 219. The positive side of condenser 218 and the forward terminal of diode 216 have a common junction 220.

Terminal 220 is connected through resistance 221 to the collector of a transistor 222. Collector of transistor 222 is connected to ground through capacitor 223, and to the base of transistor 222 through resistor 224. The base of transistor 222 is tied to the collector of grounded emitter transistor 225. The base of transistor 225 is connected to ground through resistor 226, and to the collector of transistor 225 through condenser 227. The emitter of transistor 222 and base of transistor 225 are connected by Zener diode 228 and capacitor 229 in parallel. The emitter of transistor 222 is connected to terminal 64 to provide the fixed voltage for that terminal.

Transformer 204 is also provided with secondary coils 230 and 231. Secondary coil 230 is applied to terminals 53 and 54 to provide the excitation voltage for bridge 39. Secondary winding 231 is connected to terminals 107 and 109 which excites the phase sensitive detector 43.

The device schematically presented in detail in FIGS. 3–6 may be operated to perform control of a liquid bath temperature as described in connection with FIGS. 1 and 2. The potentiometers 51 and 52 are adjusted so that bridge 49 is balanced at the desired bath temperature. When the temperature of the bath varies from that temperature, the change in resistance of thermister 16a causes bridge 39 to produce a signal which is passed successively through amplifiers 40, 41 and 42. In order to adjust the amplification for the particular size of bath and heat exchange element being employed, the gain of amplifier 41 may be modified by changing the variable resistance 69.

The amplified AC error from amplifier 42 has an amplitude proportional to the size of the temperature difference, and a phase determined by the direction of the bath temperature variance from the desired temperature. The operation of the phase sensitive detector 42 on the amplified error signal will produce a rectified signal the sign of which is dependent upon the direction of temperature variance, and the size of which is dependent on the amount of variance.

The signal is then passed through the phase lead network 44, the contacts 112a and 112b of which are preset to give the least temperature oscillation for the particular system in which the device is being used. As the signal input to the phase lead network 44 decreases, the output of the network decreases at a more rapid ratio, thus preventing or reducing overshoot of the desired temperature. In general, the larger the bath size and the smaller the heater size, the greater the value of the capacitance which contacts 112a and 112b should tie into the system.

The output of the phase lead network enters integrator 45 through transistor 124. The output of transistor 124 is fed to the base of the transistor 132, which in conjunction with transistor 137 is an extremely high gain amplifier. The output of transistor 137 is fed back through the integrating capacitor 138. The integrated signal is then passed to heater control 46 through the base of transistor 142. It should be noted that an integrator output signal is generated even when no error signal enters the integrator at transistor 124. This is accomplished by the adjustment of variable resistor 136, such that integrator output has a constant non-zero value when the bridge 39 is balanced. This steady state integrator output signal is provided to prevent temperature "droop" due to steady state heat losses or gains from the liquid bath.

In the heater control 46, the integrator output signal is fed into the base of transistor 147, which forms one branch of a voltage comparator. The other branch of the comparator, transistor 148, receives a reference signal of the character shown in FIG. 2. The reference signal is derived from a positive ramp generated by the relaxation oscillator formed by transistors 172 and 178. The positive ramp is coupled through the emitter of transistor 170 to the base of transistor 152. The gain of transistor 152 is determined by the adjustment of rheostat 157. The output of transistor 152, and thus the reference signal input to transistor 148 forming part of the comparator, is a sawtooth having a negative slope which depends upon the setting of rheostat 157. The rheostat 157 is adjusted so that the integrator output signal, indicated by meter 140, is approximately in the middle of the range from ground to the voltage on terminal 64, so that an effective heat exchange response will follow variation from the desired temperature either up or down. The period of the sawtooth is short (e.g., ⅔ second) in comparison to the time response character of the entire servo loop.

The comparator will send a signal from the collector of transistor 147 to transistor 181 only at such times during the cycle when the reference signal applied to transistor 148 exceeds the integrator output signal supplied to the base of transistor 147. During such time intervals, the comparator signal activates the heater switch 194 through transformer 191, turning on the heater 196.

In one embodiment of the system, certain of the values of the components employed are as follows.

Transistors:
    71, 79, 99, 137, 152—2N4124
    76, 132, 142, 147, 148, 170—2N4126
    172—2N4402
    178—2N4400
    124, 127—MPS 107
Diodes:
    155, 156—IN 2069
Resistors:
    85—10 ohms
    86—12 ohms
    87—15 ohms
    88—22 ohms
    89—27 ohms
    90—33 ohms
    91—39 ohms
    92—47 ohms
    93—82 ohms
    94, 129—100 ohms
    159 through 168—120 ohms
    101—1K
    80, 105, 106—15K
    97—10K
    123—150K
    125—2.2M
    111—22M
    128—6.8K
    130—390K
Condensers:
    98—100 microfarads
    119—1 microfarad
    120—2 microfarads
    102, 121, 122, 131—5 microfarads
    126—.01 microfarad Having described the invention in connection with certain specific embodiments thereof, it is to be understood that further modifications may now suggest themselves to those skilled in the art and it is intended to cover such modifications as fall within the scope of the appended claims.

What is claimed is:

1. In a temperature control servo loop wherein a liquid bath has an electrically energized heat exchange unit therein and a temperature sensing means for producing an error signal representative of the variation of the temperature of said bath from a reference temperature, the combination which comprises:
- (a) a voltage comparator having said error signal applied to a first input thereof and having a second input and producing an output signal during the time that the voltage on said first input bears a predetermined relation to the voltage on said second input,
- (b) switch means connected to said comparator to apply power to said heat exchange unit only in response to said output signal,
- (c) means for cyclically generating a reference signal for said second input which has a repetitious period small compared with the time constant of said loop and which varies over a range which includes the range of variations of said first input signal, and
- (d) means for adjusting the control loop to said bath including means for concomitantly varying the time rate of change of said reference signal and the amplification of said error signal ahead of said comparator.

2. The combination of claim 1, further comprising means for continuously generating a non-zero steady state signal and applying such signal to the first input of said compartor.

3. The combination of claim 1, further comprising means for decreasing said error signal prior to its application to said comparator more rapidly than the rate of approach of the bath temperature to the reference temperature.

4. The combination of claim 1, wherein said reference signal is linear.

5. A servo control loop for regulating the temperature of a liquid body, which includes means for generating an error signal representative of the difference in the temperature of the body and a desired temperature, means for amplifying the error signal and electrically actuable heat transfer means in the body, and which further comprises:
- (a) means for reducing the amplified error signal more rapidly than the reduction in the error signal as the error signal approaches zero,
- (b) means for integrating the amplified error signal with respect to time to produce a comparator input signal,
- (c) means for generating a repetitious reference signal which varies from a level below the comparator input signal to a level above the comparator input signal, and having a period which is short compared to the time response of the loop, and
- (d) means for actuating the heat transfer means during the portion of each cycle in which a predetermined one of the comparator input signal and the reference signal is greater than the other of said signals.

6. The combination of claim 5, further comprising:
means for adjusting the time rate of change of said reference signal, and
linking means for concurrently adjusting the amplification gain of the error signal as the time rate of change of the reference signal is adjusted.

7. The combination of claim 6 further comprising means for continuously adding a non-zero steady state signal into said comparator input signal.

References Cited

UNITED STATES PATENTS

| | | | |
|---|---|---|---|
| 2,676,290 | 4/1954 | Ciscel | 318—20.390 X |
| 3,131,340 | 4/1964 | Johnson et al. | 318—20.290 |
| 3,351,862 | 11/1967 | Cranch | 318—20.390 X |

ROBERT A. O'LEARY, Primary Examiner

C. SUKALO, Assistant Examiner

U.S. Cl. X.R.
219—497; 318—28